United States Patent Office 3,775,380
Patented Nov. 27, 1973

---

3,775,380
POLYMERIZATION OF AROMATIC NITRILES
Gordon H. Miller, Richmond, Va., assignor to
Texaco Inc., New York, N.Y.
No Drawing. Filed Sept. 1, 1971, Ser. No. 177,169
Int. Cl. C08f 1/36, 1/70, 5/00
U.S. Cl. 260—78.4 N      13 Claims

ABSTRACT OF THE DISCLOSURE

Aromatic nitriles having at least two —CN groups are polymerized by heating to a temperature of from about 410 to about 550° C. in the presence of a catalyst, such as a metal chloride, to form curable polymeric compositions which under the influence of heat and pressure can be converted to high strength, thermally stable, insoluble, infusible, polymeric materials.

BACKGROUND OF THE INVENTION

Field of the invention

This invention relates to a process for polymerizing aromatic nitriles having at least two cyano groups. More particularly, the invention relates to a process for preparing curable polymeric compositions by heating an aromatic polynitrile or an aromatic substituted 1,3,5-triazine derived from a polynitrile in the presence of a catalyst. In another aspect, this invention relates to curable B-stage resin compositions prepared from aromatic nitriles and to the cured products derived therefrom.

Description of the prior art

Karguin et al in U.S. Pat. 3,164,555 have described the preparation of a variety of polymeric products from aliphatic dinitriles by heating, for example, perfluoroglutaronitrile, etc. at a pressure of at least 5,000 kg./sq. cm. and at a temperature above 200° C. in the presence of a catalytic amount of a nitrogeneous base or by heating the same monomers in the presence of certain metal halides, such as zinc chloride, etc. in a closed vessel at a temperature above 100° C. The perfluoronitrile polymers formed are useful as antifriction drive train elements. Perfluoroether dinitriles have also been homopolymerized or copolymerized with other perfluoroether dinitriles or perfluorodinitriles having from 2 to 8 carbon atoms between the nitrile groups, such as perfluorosuberodinitrile, to give easily fabricable resins with high resistance to corrosive chemicals which are good electrical insulators (see Fritz, U.S. Pat. 3,317,484).

Of the polymers described in the art, most of them are infusible hard resinous materials which cannot be fabricated by molding. There is a definite need in the art therefore for a process to provide curable B-stage polymers derived from aromatic polynitriles which can be conveniently molded under, for example, heat and pressure, to yield cured nitrile polymers containing triazine groups.

BRIEF DESCRIPTION OF THE INVENTION

This invention relates to a process for preparing curable polymeric compositions by heating an aromatic nitrile having at least two cyano groups in the presence of a catalyst at a temperature of about 410 to about 550° C. The polymeric compositions of this invention comprise recurring triazine rings linked together through arylene groups joined to the carbon atoms of the said triazine rings. In another aspect, this invention relates to a method of curing the thus-obtained polymeric compositions at elevated temperatures and pressures to form insoluble, infusible polymeric materials.

DETAILED DESCRIPTION OF THE INVENTION

In the homopolymerization process of this invention when strating with an aromatic polynitrile, such as a dinitrile, the reaction is one of trimerization to form triazine rings. When aromatic substituted 1,3,5-triazines derived from polynitriles are employed as starting materials, the resulting polymeric product has the same general polymeric structure as achieved by homopolymerization of the aromatic dinitrile starting materials.

The general polymeric structure of the polymeric compositions of this invention is shown below where $R_1$, $R_2$ and $R_3$ may be the same or different arylene radicals and where $n$ represents the number of units of the polymer.

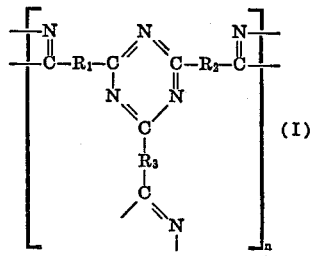

(I)

The triazine rings formed in the initial polymerization step can be linked together in a number of patterns. One possible pattern for the polymer prepared from 1,4-dicyanobenzene is shown below as Formula II while one possible pattern for the polymer prepared from 1,3-dicyanobenzene is shown below as Formula III.

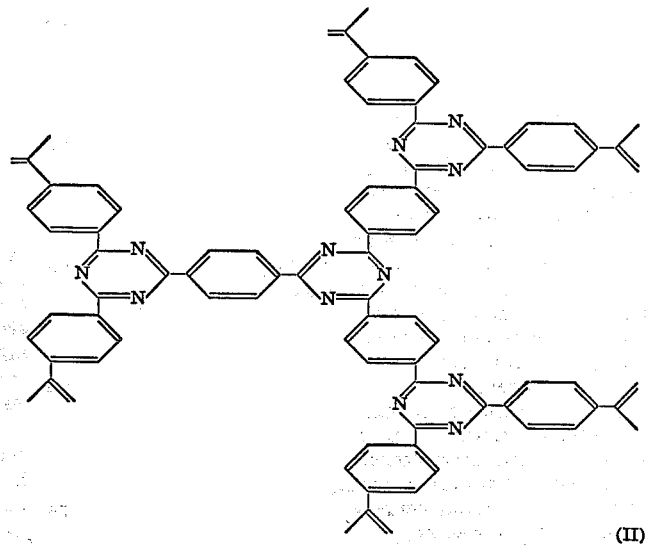

(II)

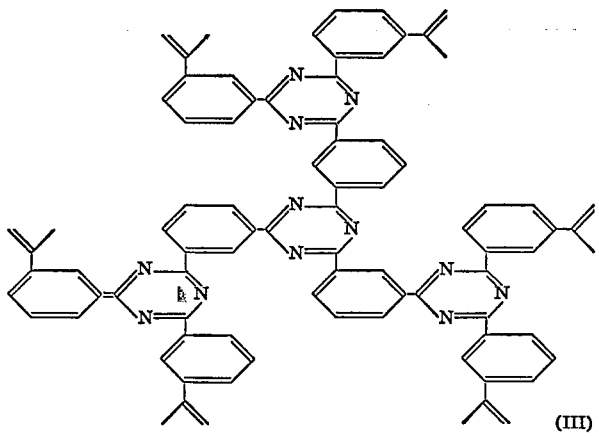

(III)

The physical properties of the polymeric materials in this invention are believed to be determined by the relative amounts of the various triazine polymers formed during the polymerization reaction.

The process of this invention is applicable to the polymerization of a wide variety of aromatic polynitriles including aromatic dinitriles, etc. as well as aromatic substituted 1,3,5-triazines derived from aromatic polynitriles to form partially polymerized products as well as fully cured, infusible, insoluble polymeric products. Usually, the aromatic polynitriles employed will have not over 100 carbon atoms and, preferably, not over 35 carbon atoms.

Polynitriles useful as starting materials in the process of this invention include, for example, compounds of the formula

where R is selected from the group consisting of hydrogen, alkyl of from 1 to 10 inclusive carbon atoms as exemplified by methyl, ethyl, propyl, pentyl, heptyl, octyl and isomers thereof, amino, nitro, hydroxyl, carboxyl and halogen selected from the group consisting of chlorine, fluorine, iodine and bromine, and $n$ is an integer of from 2 to 4 inclusive.

Among the nitriles which are suitable as starting materials in the method of this invention are orthophthalonitrile,
isophthalonitrile,
terephthalonitrile,
3-methyl-1,4-dicyanobenzene,
5-isopropyl-1,3-dicyanobenzene,
2,5-dimethyl-1,4-dicyanobenzene,
2-chloro-1,3-dicyanobenzene,
5-bromo-1,4-dicyanobenzene,
5-amino-1,3-dicyanobenzene,
3-nitro-1,2-dicyanobenzene,
2-carboxyl-1,4-dicyanobenzene,
2-(dichloromethyl)-1,3-dicyanobenzene,
2-ethyl-3-chloro-1,4-dicyanobenzene,
4-hydroxy-1,3-dicyanobenzene,
2-n-octyl-1,4-dicyanobenzene,
3-nitro-1,2-dicyanobenzene,
1,3,5-tricyanobenzene,
2-chloro-1,3,5-tricyanobenzene,
3-fluoro-1,4,5-tricyanobenzene,
6-nitro-1,3,5-tricyanobenzene,
2-hydroxy-3,4,5-tricyanobenzene,
4-methyl-1,3,5-tricyanobenzene,
1,2,4,5-tetracyanobenzene,
3-hydroxy-1,2,4,5-tetracyanobenzene,
2-bromo-1,3,4,5-tetracyanobenzene,
3-nitro-1,2,4,5-tetracyanobenzene,
2-isopropyl-1,3,4,5-tetracyanobenzene,
3-n-pentyl-1,2,4,5-tetracyanobenzene, etc.

Mixtures of the above-mentioned aromatic polynitriles, such as a mixture of about 66 percent by weight of isophthalonitrile (i.e., 1,3-dicyanobenzene) and about 34 percent by weight of terephthalonitrile (i.e., 1,4-dicyanobenzene) can be employed in this process, if desired. Isophthalonitrile and terephthalonitrile are especially valuable starting materials for use of the process of this invention. In addition to the examples above, other substituted aromatic polynitriles can be employed. For example, those containing groups derived from a carboxyl group, such as carboxylic salts, amides and esters thereof, as well as nitrosulfone and sulfonic acid groups.

Also, in the process of this invention aromatic substitutes 1,3,5-triazines prepared from any of the above-listed aromatic polynitriles or mixtures thereof can be employed as starting materials. Such aromatic substituted 1,3,5-triazines can be prepared by the method set forth in Miller application entitled Process for Trimerization of Nitriles (Ser. No. 72,224) filed of even date herewith or by the process set forth by Toland in U.S. Pat. 3,060,179.

Typical of the aromatic substituted 1,3,5-triazine products formed by trimerizing an aromatic dinitrile is 2,4,6-tris(3-cyanophenyl)-1,3,5-triazine prepared from isophthalonitrile which has the formula:

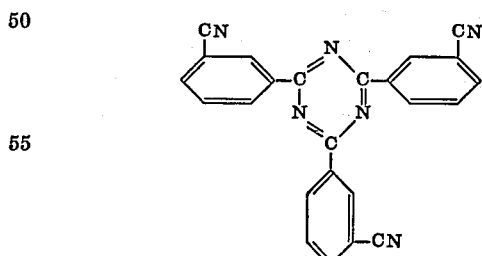

Polymerization conditions

The temperature at which the polymerization reaction of this invention is carried out can be varied widely although generally the temperature utilized will be from about 410 to about 550° C. and, preferably, will be from about 420 to about 510° C. A wide variety of products result which are, in general, solids at room temperature but at elevated temperatures range from highly fluid to viscous and to rigid, infusible polymeric materials. Among the products which can be made are partially cured thermoplastic compositions which, in this specification, are referred to as B-stage resins. Such compositions can be conveniently cured under the influence of heat or heat and pressure to yield rigid, infusible, insoluble compositions.

The products formed in the early stages of this process are at elevated temperatures highly fluid, liquid polymers and as the polymerization continues they become soft materials and finally rigid, infusible, insoluble polymeric products result. The final products, i.e., the completely cured compositions, are presumably highly crosslinked materials. The products of this invention are extremely insoluble materials which exhibit negligible solubility in organic liquids, such as ethers, ketones and aromatic hydrocarbons, such as ethyl n-propyl ether, methyl isobutyl ketone, diethyl ether, N-methyl-2-pyrrolidone, Decalin, p-chlorobenzene, o-chlorobenzene, bromobenzene, aniline, and toluene.

The amount of catalyst employed in preparing the curable compositions of this invention can be varied widely. Generally, from about 0.1 to about 50 weight percent of the catalyst based on the weight of the monomer charged to the reactor will be utilized although, preferably, this amount will be from about 0.5 to about 5.0 weight percent on the same basis.

A wide variety of catalysts may be utilized in conducting the process of this invention. Useful catalysts include:

(A) Compounds of non-metals, such as phosphorus pentoxide, non-metal halides, such as phosphorus trichloride, phosphorus tribromide, phosphorus triiodide, phosphorus pentachloride, phosphorus pentabromide, arsenic tribromide, arsenic triiodide and arsenic trichloride;

(B) Acids such as sulfuric acid, hydrochloric acid, hydrofluoric acid, fluosulfonic acid, chlorosulfonic acid, etc.; and (C) Halides of metals of Groups II, III, IV, V and VIII of the Periodic Table as set forth on page 125 of Mellor's Modern Inorganic Chemistry, revised edition, Longmans, Green and Co., Ltd. (1967), such as zinc chloride, aluminum chloride, aluminum iodide, aluminum bromide, ferric chloride, titanium tetrachloride, antimony trichloride, antimony trifluoride, antimony triiodide, boron trichloride, boron trifluoride, arsenic chloride, cuprous chloride, cobalt bromide, vanadium tetrafluoride, manganous bromide, manganic chloride, strontium fluoride, strontium chloride, zirconium tetriodide, zirconium tetrachloride, stannous chloride, and stannic iodide.

A highly important facet of this invention is that after the conversion operation has been completed the unreacted nitrile may be removed overhead from the reaction mixture by sublimation, leaving as bottoms the polmeric material which is available for further polymerization to the fully cured polymeric product. This sublimation scheme can be applied to purification of the polymeric product whether the polymerization is carried out at atmospheric or at high pressures.

The catalyst may be removed from the curable compositions of this invention, if desired, or it may be left in the product and the final curing of the composition completed in the usual manner under the influence of heat alone or under heat and pressure. Prior to the final curing operation removal of the catalyst can be accomplished by a variety of methods. If a volatile catalyst, such as ferric chloride, titanium tetrachloride, aluminum chloride, antimony trichloride, antimony pentachloride, arsenic trichloride, arsenic pentachloride, boron trichloride, phosphorus trichloride, phosphorus pentachloride, stannic chloride, vanadium tetrachloride, or zirconium tetrachloride is employed in the polymerization reaction it can be conveniently removed from the reaction mixture along with unreacted polynitrile monomer by sublimation. Non-volatile catalysts, such as zinc chloride, phosphorus pentoxide, strontium dichloride, etc., as well as the volatile catalysts previously mentioned can be removed from the curable compositions by solvent extraction with, for example, acetone, benzene, xylene, methanol, ethanol, diethyl ether or acetonitrile, etc. In addition, the non-volatile catalysts previously enumerated above can be removed by a water wash.

The polymeric compositions of this invention can be cured to form a variety of products ranging from materials which are highly viscous liquids at elevated temperatures to completely cured, hard, rigid, infusible solids. Such completely cured materials possess remarkable physical properties. For example, the completely cured products after being heated for as long as 5 hours at 30° C. in air show a negligible weight loss and exhibit no oxidation effects. Likewise, these same polymeric materials can be heated in the absence of air to 500° C. for 5 hours or more with no visible change taking place and the strength may be improved thereby. The polymers of this invention do not sustain combustion and when heated in air to a red heat (about 720° C.) there is no apparent decomposition although slow oxidation takes place.

The polymeric compositions of this invention including the B-stage resins previously mentioned, can be cured by heating to a temperature of about 300 to about 600° C. for a period of about 10 minutes to about 10 hours or more. Generally, curing is conducted under the influence of both heat and pressure. Temperatures of about 300 to about 600° C. and, preferably, from about 400 to about 550° C. are used while the pressure is maintained at from about zero to about 10,000 p.s.i. for a period of time ranging from about 10 minutes to about 10 hours or more. The completely cured products exhibit flexural strengths of from about 2000 to about 15,000 p.s.i. or more and compressive strengths of about 4000 to about 40,000 p.s.i. or more. The densities of the completely cured products range from about 1.20 to about 1.40 or more.

Under certain circumstances, such as when it is desired to moderate the polymerization step, it may be desirable to conduct the reaction in the presence of the liquid carrier, such as 1,2,3,4-tetrahydronaphthalene, 1-methylnaphthalene, biphenyl, etc. When employing a liquid carrier the reactor is operated under sufficient pressure so that the carrier remains in the liquid state or the pressure of the reactor is selected so that the carrier is allowed to boil and reflux.

Aromatic mononitriles, such as benzonitrile, o-toluonitrile, m-toluonitrile, p-toluonitrile, 2-naphthonitrile, phenylbenzonitrile, p-t-butylbenzonitrile, p-chlorobenzonitrile, m-fluorobenzonitrile, 2,4 - dichlorobenzonitrile, p - bromobenzonitrile, etc. and aliphatic mononitrile, such as acetonitrile, propionitrile, n-butyronitrile, isobutyronitrile, n-amylnitrile, isoamylnitrile, etc. and mixtures thereof, may be added to the polymerization reaction mixture, if desired. Such mononitriles serve to moderate the polymerization reaction and to control the molecular weight of the resulting polymeric products. Generally, from about 0.1 to about 25 weight percent of the mononitriles based on the weight of the aromatic polynitrile or mixtures thereof charged to the reactor will be used.

Prior to the curing operation a wide variety of fillers and reinforcing agents can be added to the curable polymeric compositions of this invention. Illustrative of the many fillers which can be utilized with the compositions of the present invention are titanium dioxide, lithopone, zinc oxide, lead oxide, alumina, zirconium silicate, iron oxide, diatomaceous earth, calcium carbonate, fumed silica, precipitated silica, glass fibers, magnesium oxide, crushed quartz, calcined clay, asbestos, carbon, carbon fibers, graphite, petroleum coke, kilned wood flour, synthetic fibers, etc. Usually from about 5 to about 1000 parts of filler or reinforcement per 100 parts of the curable polymeric composition are added.

B-stage polymeric compositions

The B-stage polymeric compositions previously referred to represent particularly useful materials in that they can be conveniently molded into rod, sheet, tubing, etc. Such B-stage resins are defined herein as curable polymeric compositions of this invention which have been polymerized to the extent that they are partially cured and quite stable for extended periods of time. They represent relatively low molecular weight thermoplastic polymers which are solid at room temperature and which are capable of being cured to yield infusible, insoluble polymeric compositions (i.e. "C-stage" compositions).

Curing of the B-stage compositions can be conducted in the same manner as previously set forth above for the curable polymeric compositions of this invention, that is, at a temperature of about 300 to about 600° C. under a pressure ranging from about 100 to about 10,000 p.s.i. and for a period of time of about 10 minutes to about 10 hours or more. The temperature, pressure, and period of heating selected in the curing operation will depend on the particular aromatic nitrile, catalyst, etc. used in making the B-stage composition.

The B-stage polymeric compositions are prepared in the same manner as utilized in preparing the other curable polymeric compositions of this invention. Any of the aromatic polynitriles including the aromatic dinitriles, etc., as well as the aromatic substituted 1,3,5-triazines and catalysts set forth above can be used. Generally, the B-stage polymeric compositions are prepared by heating an aromatic polynitrile or mixtures of these nitriles with a suitable catalyst at a temperature of about 410 to about 550° C. for a period of about 0.5 to about 6 hours. Removal of unreacted aromatic nitrile monomer as well as of the catalyst, if desired, can be accomplished by the procedures set forth under "Polymerization Conditions" above.

The B-stage resins of this invention can be ground to form molding powders having a mesh size of about 20 to about 400 or finer. Such grinding operations can be conveniently conducted using a ball mill or any other suitable grinding equipment.

An A-stage polymer is defined herein as a relatively low molecular weight polymeric composition of this invention which is a highly fluid material in the molten state at an elevated temperature. Such A-stage products can, of course, be further polymerized to B-stage materials and they may also be cured under the same conditions, as previously set forth, to form the final cured infusible, insoluble polymeric products.

In preparing B-stage polymers it is necessary to stop the polymerization and curing action before the C-stage is reached. At higher polymerization temperatures care must be exercised that the time of polymerization is not extended to the point that a C-stage material results. Likewise, at lower polymerization temperatures the heating time required to arrive at the B-stage will be longer and it is possible to exercise more control. By checking the viscosity of the polymerization mixture periodically one can avoid formation of an insoluble, infusible C-stage product. One way of obtaining an indication of the approximate time required to arrive at the B-stage is to first conduct the polymerization reaction on a small scale.

The polymeric products of this invention are useful in a wide variety of applications, such as for bushings, molded articles, etc., especially where the ability to withstand elevated temperatures is required. The completely cured compositions can be machined to produce a variety of parts, such as housings, liners or impellers for pumps useful in handling a number of organic liquids, such as alcohols, ketones, ethers, amines, etc. When compounded with glass fibers, asbestos, etc., the B-stage resins can be molded and cured to form, for example, duct work for use in chemical exhaust systems and for the preparation of solvent-resistant pipe useful for handling acetone, methyl alcohol, diethylamine and corrosive gases such as chlorine, etc.

The following examples illustrate various embodiments of this invention and are to be considered not limitative.

EXAMPLE I

To approximately 5 g. of 1,4-dicyanobenzene there was added with mixing an amounnt of zinc chloride dissolved in anhydrous methanol equal to 0.5 weight percent of the dinitrile. The methanol was slowly evaporated from the mixture while mixing was continued. The resulting material was dried, ground to a powder, and placed in approximately equal quantities in four ⅜ inch I.D. by 4½ inch long stainless steel tubes which were welded shut at one end and fitted with ⅜ inch compression fitting and plugs at the other end. The tubes were evacuated, flushed with nitrogen several times, sealed and weighed. The four tubes were placed in a rocking device which was put in an oven maintained at 450° C and the rocking mechanism was started. One sample was removed from the oven after 0.25 hour and a second was removed after 1.0 hour; however, in these instances, no products were obtained due to leakage from the tubes. The third sample (I–C), removed at the end of 2.0 hours, contained a solid polymer which when molten was quite fluid (weight about 1.2055 g.), the fourth sample (I–D), removed at the end of 3.0 hours, contained about 1.2065 g. of a highly cured polymer.

The polymeric product of Sample 1–C was converted to a molding powder by grinding in a mortar. A portion of the molding powder formed from Sample 1–C was molded in a steel mold under a pressure of 2000 p.s.i. while the temperature was raised from 220 to 446° C. over a period of 7.1 hours and then given a final cure for 2.5 hours at 450° C. under a pressure of 2000 p.s.i.a. to yield a hard black pellet ⅛ inch in diameter and about ½ inch in length which was found on testing to have a compressive strength of 20,040 p.s.i. and a density of 1.24 g./cc.

The polymeric product of Sample I–C was submitted for elemental analysis and the following results were obtained:

Theoretical ($C_8H_4N_2$) (percent): C, 74.98; H, 3.15; N, 21.87. Found (percent): C, 75.09; H, 3.54; N, 21.37.

On the basis of the elemental and infrared analyses, it was determined that the structure of the polymeric product was consistent with structure (I) shown above.

EXAMPLE II

This example was conducted in the same manner and with the same apparatus employed in Example I. The polymerization tubes were loaded with the same amount of 1,4-dicyanobenzene and zinc chloride catalyst which was utilized in Example I, the tubes were placed in the rocking device and were put into the oven heated to 450° C., after which the rocking mechanism was started. At the end of 3.6 hours, the first tube (Sample II–A) was removed and found to contain about 1.3089 g. of a triazine polymer which when melted was a very fluid material.

The second tube (Sample II–B), which was removed after 4.05 hours, contained about 1.1837 g. of polymeric product which in the molten state was a viscous B-stage material. Sample tube II–C which was removed at the end of 2.88 hours and sample tube II–D which was removed at the end of 3.75 hours both contained material which in the molten state were very fluid products.

Sample II–B was ground to form a molding powder and a portion was molded and cured at 2000 p.s.i.a. by first heating to a temperature of from 220 to 394° C. over a period of 2.8 hours and afterwards heating at 450° C. for 2.5 hours under the same pressure to form a black, hard, infusible pellet ⅛ inch in diameter by ½ inch in length. The compressive strength of the pellet was measured and found to be 15,270 p.s.i. while the density was 1.28 g./cc.

A second portion of the molding powder derived from Sample II–B was molded and cured to form a pellet in the same manner as described above except that the molding and curing was conducted by first heating to a temperature of from 220 to 394° C. in 3.0 hours at 2000 p.s.i.a. and finally heating for 18.5 hours at 450° C. at the same temperature. The resulting pellet was a shiny, black, hard, infusible solid.

The pellet thus formed was analyzed for carbon, hydrogen, and nitrogen and the following results were obtained: Theoretical ($C_8H_4N_2$) (percent): C, 74.98; H, 3.15; N, 21.87. Found (percent): C, 75.22; H, 3.57; N, 21.21.

It was determined that the structure of the polymeric product agreed with that of structure (I) shown above on the basis of results obtained by infrared and the elemental analyses.

EXAMPLE III

A mixture of 1,3-dicyanobenzene and zinc chloride was prepared by adding with mixing to approximately 5 g. of 1,3-dicyanobenzene sufficient zinc chloride dissolved in anhydrous methanol equal to 0.5 weight percent of the dinitrile. After removal of the solvent by evaporation, the resulting mixture was dried, ground to a powder, and charged in equal quantities to four polymerization tubes identical to those employed in Example I. The four samples were polymerized in the same manner as in Example I at 450° C. No product was formed in sample tube III–A because of the loss of the charge during the heating period. Sample tube III–B which was removed at the end of 1.0 hour and Sample tube III–C which was removed at the end of 3.0 hours both contained polymeric products which were highly fluid materials in the molten state.

Sample tube III–D which was removed at the end of 4.0 hours contained about 1.2390 g. of a polymer which in the molten state was a viscous B-stage polymeric composition.

Sample III–D, after having been ground to a powder in a mortar, was placed in a steel mold and cured at a pressure of 2000 p.s.i. by first heating the sample from a temperature of 155 to 420° C. over a period of 3.0 hours and then heating at 450° C. under the same pressure for 2.5 hours. A completely cured, hard, black, infusible pellet ⅛ inch in diameter by about ½ inch in length was obtained which on testing exhibited a flexure strength (short beam shear) of 2,710 p.s.i., a compressive strength of 3,280 p.s.i., and a density of 1.33 g./cc. In the flexure test the pellet was suspended between rods 0.35 inch apart and a round nose or rod was impressed at right angles on the center of the suspended specimen until the force applied caused the pellet to break.

EXAMPLE IV

To 6.0003 g. of 1,3-dicyanobenzene and 3.0001 g. of 1,4-dicyanobenzene which had been mixed together there was added with mixing 0.0451 g. of zinc chloride dissolved in absolute methanol (equivalent to 0.5 weight percent of zinc chloride based on the weight of the dinitriles previously added). The methanol was removed by evaporation and, after the mixture had been dried in a vacuum oven, it was ground to a powder.

Portions of the above-described powder were added to each of four stainless steel polymerization tubes which were identical to the polymerization tubes employed in Example I. The tubes were placed in a vacuum jar and thoroughly evacuated to remove air after which they were sealed under a nitrogen blanket. Next, the filled tubes were attached to the rocker device employed in Example I, placed in an oven maintained at 450° C. and the rocker mechanism started. The sample tubes were removed at the end of 1, 2, 3, and 4 hours, respectively, and a portion of the polymeric material from each sample tube was melted in a test tube to determine by visual observation of the fluidity if a satisfactory B-stage polymeric material had been formed.

Sample IV–A, which was removed from the oven at the end of one hour, was a light tan material containing some white particles and was not further examined or tested. The sample removed at the end of 2.0 hours (IV–B), although black and moderately hard, was a highly fluid material when melted, while IV–C which was removed at the end of 3.0 hours was a viscous B-stage material in the molten state. In contrast, Sample IV–D, removed at the end of 4.0 hours, was a high cured, thermoset polymer.

Sample IV–C was ground in a mortar to form a powder and, using steel molds of the same type as employed in Example I, a total of eight pellets, i.e., cured, infusible polymeric products of ⅛ inch in diameter by about ½ inch in length were prepared. Pertinent details are given in Table I, following:

TABLE I.—CURING OF B-STAGE POLYMER IV-C

| Sample | Pressure (p.s.i.) | Temperature (° C.) | Time (hours) | Total time (hours) | Comments [b] |
|---|---|---|---|---|---|
| IV-C-1 | 2,000 | [a] 155–420 / 450 | 3 / 4 | 7 | No mold leaks. |
| IV-C-2 | 2,000 | 320 / 450 | 0.5 / 4.0 | 4.5 | |
| IV-C-3 | 2,000 | 450 | 4.0 | 4.0 | Pellet adhered to mold, removed with difficulty, broke during removal. |
| IV-C-4 | 2,000 | 450 | 4.0 | 4.0 | |
| IV-C-5 | 2,000 | 450 | 5.0 | 5.0 | |
| IV-C-6 | 2,000 | 450 | 5.0 | 5.0 | Plunger and pellet moved in mold to avoid sticking. |
| IV-C-7 | 2,000 | 450 | 5.0 | 5.0 | Slight seepage after 45 min. |
| IV-C-8 | 2,000 | 450 | 4.7 | 4.7 | Pellet removed while hot. |

[a] Sample was heated under 2,000 p.s.i. in 30-minute stages at 155, 275, 320, 350, 380 and 420° C.

[b] Product was a hard, black, infusible cured polymeric material of good appearance in each instance.

The flexure, tensile, and compressive strengths as well as the density were measured for several of the pellets described in Table 1, above, and these values are reported in Table 2. These tests were conducted in the same manner as in the previous examples.

TABLE 2

| Sample | Density (g./cc.) | Flexure (short beam shear) (p.s.i.) | Tensile (p.s.i.) | Compression (p.s.i.) |
|---|---|---|---|---|
| IV-C-1 | 1.29 | 5,160 | | 16,750 |
| IV-C-2 | 1.30 | 5,560 | | 13,150 |
| IV-C-4 | | | 1,645 | |
| IV-C-6 | | | 3,010 | |

Pellet IV–C–4 was analyzed for carbon, hydrogen, and nitrogen and the following results were obtained: Theoretical ($C_8H_4N_2$) (percent): C, 74.98; H, 3.15; N, 21.87. Found (percent): C, 75.24; H, 3.73; N, 21.03.

On the basis of results obtained by infrared analysis and on the elemental analysis reported above, it was determined that the structure of the polymeric product (Sample IV–C–4) was in agreement with structure (I) shown above.

EXAMPLE V

A total of 24 g. of zinc chloride was dissolved in absolute methanol and added to 118.2 g. of 1,4-dicyanobenzene after which the mixture was thoroughly stirred to distribute the catalyst. After the methanol had been removed by evaporation, the solid material resulting was broken up and added to the reactor, i.e., a rocking autoclave (1000 ml. capacity). At the same time, six stainless steel balls (¾ inch O.D.) were placed in the reactor to assist in keeping the materials mixed during the reaction period. The reactor was closed, air was removed by a vacuum pump and it was back-filled with nitrogen. The reactor was placed in the heater, the rocking mechanism started, and the temperature brought up to 450° C. in about 2.25 hours, following which the reactor was maintained at that temperature for 3.28 hours. Then the reactor was removed from the heater, quenched in water and the resulting polymeric product was removed. The bulk of the product was obtained in large lumps which were broken up and afterward ground to a powder. A total of 96.4 g. of the B-stage product (equal to 80 percent of the weight of the charged material) was recovered.

A pellet was prepared in a ⅛ inch I.D. steel mold by heating the powdered B-stage product at 450° C. for 3.5 hours under a pressure of 2000 p.s.i. A pellet of excellent appearance (⅛ inch in diameter and ½ inch in length) was obtained. The compression strength of the pellet was measured and found to be 16,020 p.s.i. and the flexure strength (short beam shear) determined in the same manner as in the previous examples was 5,685 p.s.i. Density of the pellet was 1.22 g./cc. By infrared analysis it was determined that the structure of the resulting triazine polymer was in agreement with Formula I above.

EXAMPLE VI 1,4-dicyanobenzene (60.0995 g.) and zinc chloride (0.6595 g.) were added to a flask fitted with a magnetic stirrer, thermometer, air condenser and drying tube. After flushing with nitrogen to remove air, the material added and flask were heated with stirring at a temperature of 270° C. for 5 hours. Crude trimer product (i.e., 2,4,6-tris(4-cyanophenyl)-1,3,5-triazine) which was recovered in the amount of 58.7680 g. was washed several times with xylene by decantation and centrifugation. Finally, the product was washed with water to remove the zinc chloride catalyst. The final purified product weight was 37.4709 g. (Yield: 62.4 weight percent).

A portion of the purified trimer prepared above, after being ground to a powder was put into each of two stainless steel polymerization tubes which were then evacuated to remove air, back-filled with nitrogen, sealed and then heated to 500° C. for 35 minutes. After cooling, the resulting B-stage product was removed from the polymerization tubes.

A portion of the B-stage product thus formed (3.8773 g.) was then washed with hot xylene to remove impurities, such as 1,4-dicyanobenzene introduced originally with the charged trimer. The yield of dried, purified, B-stage product recovered was 33.3 weight percent (based on weight of 1,4-dicyanobenzene).

A portion of the thus obtained purified B-stage polymer was cured in a ⅛ inch I.D. steel mold under a pressure of 2000 p.s.i. The temperature was raised for 295 to 460° C. over a 3 hour period and the mold and contents maintained at that temperature for 30 minutes and then at 500° C. for 2.5 hours.

The resulting pellet was tested and found to have a compressive strength of 22,900 p.s.i.

EXAMPLE VII

To a flask equipped with a magnetic stirrer, themometer, air condenser and drying tube 60.0 g. of 1,3-dicyanobenzene and 0.9 g. of zinc chloride were added. After the flask had been flushed with nitrogen, it was heated and maintained in the temperature range of 270–275° C. for 3.3 hours. The crude trimer obtained (i.e., 2,4,6-tris(3-cyanophenyl)-1,3,5-triazine) which weighed 60.4404 g. was purified by extraction with hot m-xylene on Soxhlet equipment after which the residue was washed with hot and cold water to remove zinc chloride. The residue which was identified as pure 2,4,6-tris(3-cyanophenyl)-1,3,5-triazine weighed 33.3382 g. (yield: 55.6 weight percent).

A portion of the thus-obtained purified trimer was placed in each of two stainless steel polymerization tubes which were evacuated, filled with nitrogen, sealed and then heated at 500° C. for 1.25 hours. After cooling, the B-stage material formed was removed from the tubes, mixed and ground to a powder.

A portion of the above-prepared B-stage molding powder was placed in a ⅛ inch I.D. mold and cured under a pressure of 2000 p.s.i. The mold was heated to 420° C. over a period of 1.2 hours, was maintained at 450° C. for 1 hour and then held at 500° C. for 1 hour. After removal from the mold, a part of the pellet was tested and found to have a compressive strength of 4250 p.s.i. Elemental analysis of the pellet gave the following results:

Theoretical ($C_8H_4N_2$) (percent): C, 74.98; H, 3.15; N, 21.86. Found (percent): C, 75.46; H, 3.60; N, 20.94.

By infrared analysis it was ascertained that the structure of the resulting triazine polymer was in agreement with Formula I above.

A second part of the pellet was placed inside a quartz tube, the tube was evacuated, sealed and the assembly heated at 500° C. for 4.5 hours. Upon removal from the tube the compressive strength of the thus-treated pellet was measured and found to be 8200 p.s.i.

What is claimed is:

1. A process for preparing curable polymeric compositions which comprises heating an aromatic polynitrile at a temperature of about 410 to about 550° C. in the presence of a catalyst selected from the group consisting of:
   (a) phosphorus pentoxide, phosphorus trichloride, phosphorus pentachloride, arsenic trichloride, and arsenic pentachloride;
   (b) hydrochloric acid, hydrofluoric acid, fluosulfonic acid, chlorosulfonic acid, and
wherein the said aromatic polynitrile has the formula:

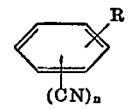

wherein R is selected from the group consisting of hydrogen, alkyl of from 1 to 10 inclusive carbon atoms, amino, nitro, hydroxyl, carboxyl and halogen, and $n$ is an integer of from 2 to 4 inclusive.

2. The process of claim 1 wherein the said aromatic polynitrile has the formula:

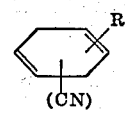

wherein R is selected from the group consisting of hydrogen, alkyl of from 1 to 10 inclusive carbon atoms, amino, nitro, hydroxyl, carboxyl and halogen, and $n$ is the integer 2.

3. The process of claim 1 wherein said aromatic polynitrile has the formula:

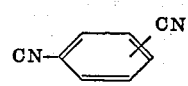

4. The process of claim 1 wherein the said aromatic polynitrile is isophthalonitrile.

5. The process of claim 1 wherein the said aromatic polynitrile is terephthalonitrile.

6. The process of claim 1 wherein the said aromatic polynitrile is a mixture of about 66 percent by weight of isophthalonitrile and about 34 percent by weight of terephthalonitrile.

7. The process of claim 1 wherein from about 0.1 to about 50 weight percent of the said catalyst is employed based on the weight of the polynitrile.

8. The process of claim 1 wherein the said catalyst is selected from the group consisting of phosphorus pentoxide, phosphorus trichloride, phosphorus pentachloride, arsenic trichloride and arsenic pentachloride.

9. The process of claim 1 wherein the said catalyst is selected from the group consisting of arsenic trichloride, arsenic pentachloride, phosphorus trichloride, and phosphorus pentachloride, and at the conclusion of the reaction period the catalyst and unreacted dinitrile are sublimed from the reaction mixture.

10. The process of claim 1 wherein the said catalyst is selected from the group consisting of hydrochloric acid, hydrofluoric acid, fluosulfonic acid, and chlorosulfonic acid.

11. The process of claim 1 wherein the said catalyst is selected from the group consisting of fluosulfonic acid and chlorosulfonic acid.

12. A process for preparing a curable polymeric composition which comprises heating an aromatic substituted 1,3,5-triazine derived from an aromatic polynitrile at a temperature of about 410 to about 550° C. in the presence of a catalyst selected from the group consisting of:
  (a) phosphorus pentoxide, phosphorus trichloride, phosphorus pentachloride, arsenic trichloride, and arsenic pentachloride;
  (b) hydrochloric acid, hydrofluoric acid, sulfuric acid, fluosulfonic acid, chlorosulfonic acid, and
wherein the said triazine has the formula:

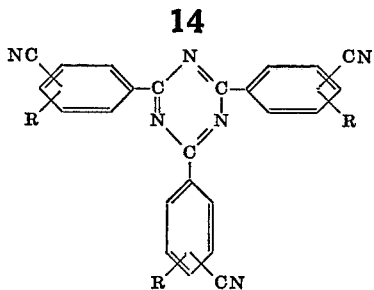

wherein R is selected from the group consisting of hydrogen, alkyl of from 1 to 10 inclusive carbon atoms, amino, nitro, hydroxyl, carboxyl and halogen.

13. The process of claim 12 wherein the said triazine is selected from the group comprising isophthalonitrile and terephthalonitrile.

References Cited

UNITED STATES PATENTS

| | | | |
|---|---|---|---|
| 3,609,128 | 9/1971 | Johns | 260—78.4 N |
| 3,060,179 | 10/1962 | Toland | 260—248 |
| 3,164,555 | 1/1965 | Karquin et al. | 260—2 |

JOSEPH L. SCHOFER, Primary Examiner

J. KIGHT III, Assistant Examiner

U.S. Cl. X.R.

260—2 R; 88.7 A, C, D, E, F, 248 R, CS

UNITED STATES PATENT OFFICE
CERTIFICATE OF CORRECTION

Patent No. 3,775,380     Dated November 27, 1973

Inventor(s) Gordon H. Miller

It is certified that error appears in the above-identified patent and that said Letters Patent are hereby corrected as shown below:

Column 2, line 23, the word "strating" should read --starting--.

Column 4, lines 37-38, the word "substitutes" should read --substituted--.

Column 5, line 46, the word "polmeric" should read --polymeric--.

Column 7, line 74, the word "amounnt" should read --amount--.

Column 10, Table I, the heading "Total Time (h urs)" should read --Total Time (hours)--.

Claim 2, column 12, the formula should read -- 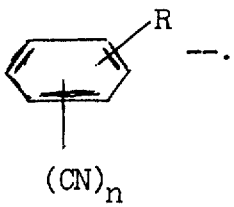 --.

Signed and sealed this 16th day of April 1974.

(SEAL)
Attest:

EDWARD M. FLETCHER, JR.
Attesting Officer

C. MARSHALL DANN
Commissioner of Patents